United States Patent [19]

Toda

[11] 4,181,317

[45] Jan. 1, 1980

[54] BABY CARRIAGE

[75] Inventor: Tokuzo Toda, Shiroi, Japan

[73] Assignee: Kabushiki Kaisha Tokyo Bebi, Tokyo, Japan

[21] Appl. No.: 904,033

[22] Filed: May 8, 1978

[30] Foreign Application Priority Data

Oct. 25, 1977 [JP] Japan .......................... 52/143848[U]
Oct. 25, 1977 [JP] Japan .......................... 52/143849[U]

[51] Int. Cl.² ............................................. B62B 11/00
[52] U.S. Cl. ...................................... 280/42; 280/650;
297/369
[58] Field of Search .................................. 280/647–650, 280/42; 297/355, 356, 367, 368, 369, 370, 371

[56] References Cited

U.S. PATENT DOCUMENTS

| 2,567,626 | 9/1951 | Trouslot | 297/369 |
| 4,118,052 | 10/1978 | Cabagnero | 280/650 |

*Primary Examiner*—Robert R. Song
*Attorney, Agent, or Firm*—Oblon, Fisher, Spivak, McClelland & Maier

[57] ABSTRACT

A baby carriage having a foldable frame to which is pivotably connected reclining rest rods which support the back of the carriage seat. The rest rods can be inclined to any selected one of a plurality of predetermined positions, as determined by a locking mechanism rigidly attached to the foldable carriage frame and pivotably connected to the inclined rest rods. Operating rod members are movably connected to the rest rods to select a desired seating inclination and to engage the locking mechanism in accordance with the selected inclination.

4 Claims, 10 Drawing Figures

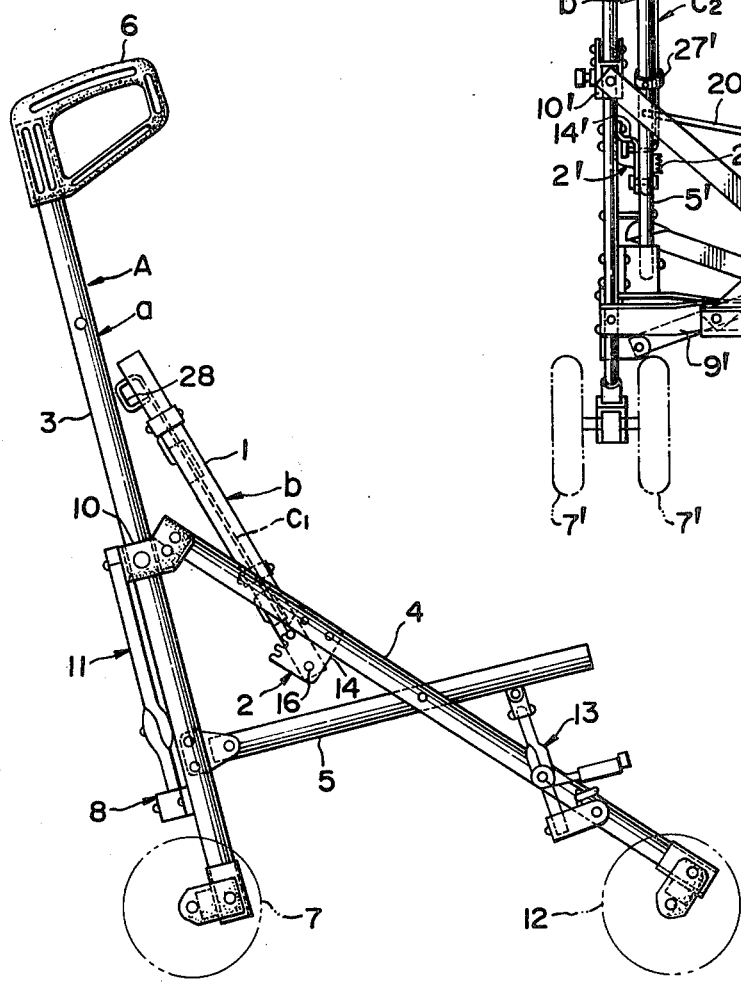
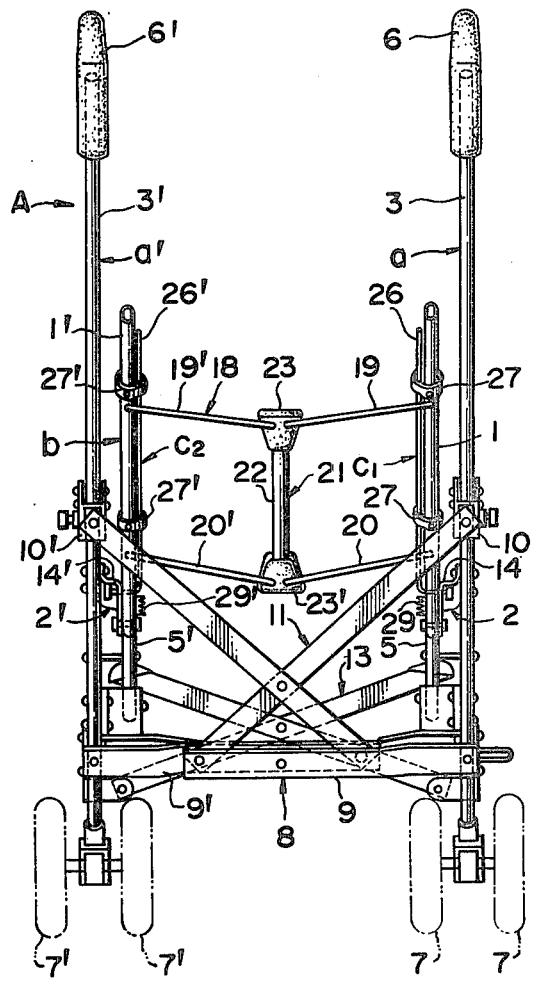

FIG. 3
FIG. 4
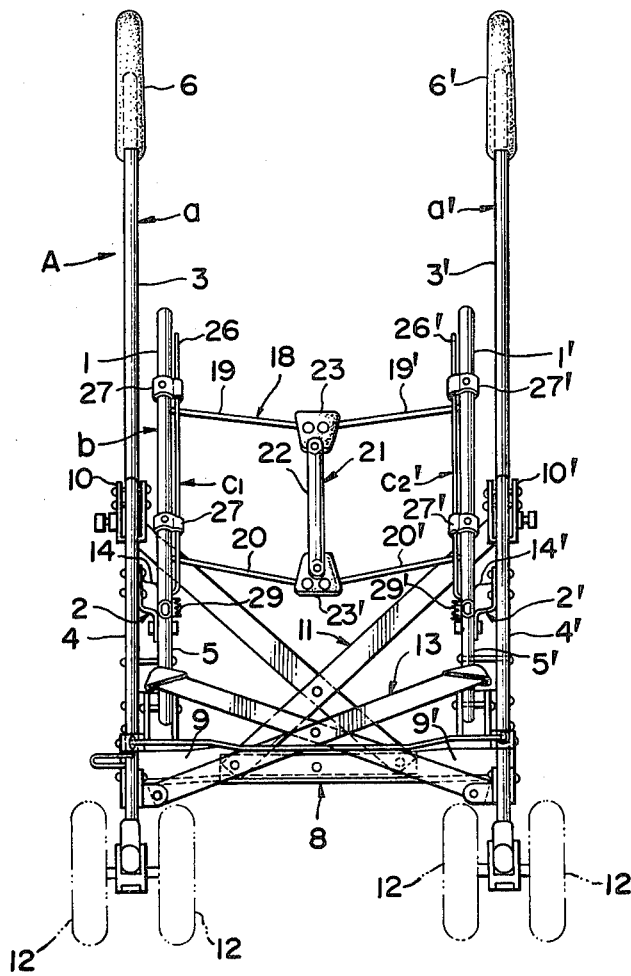
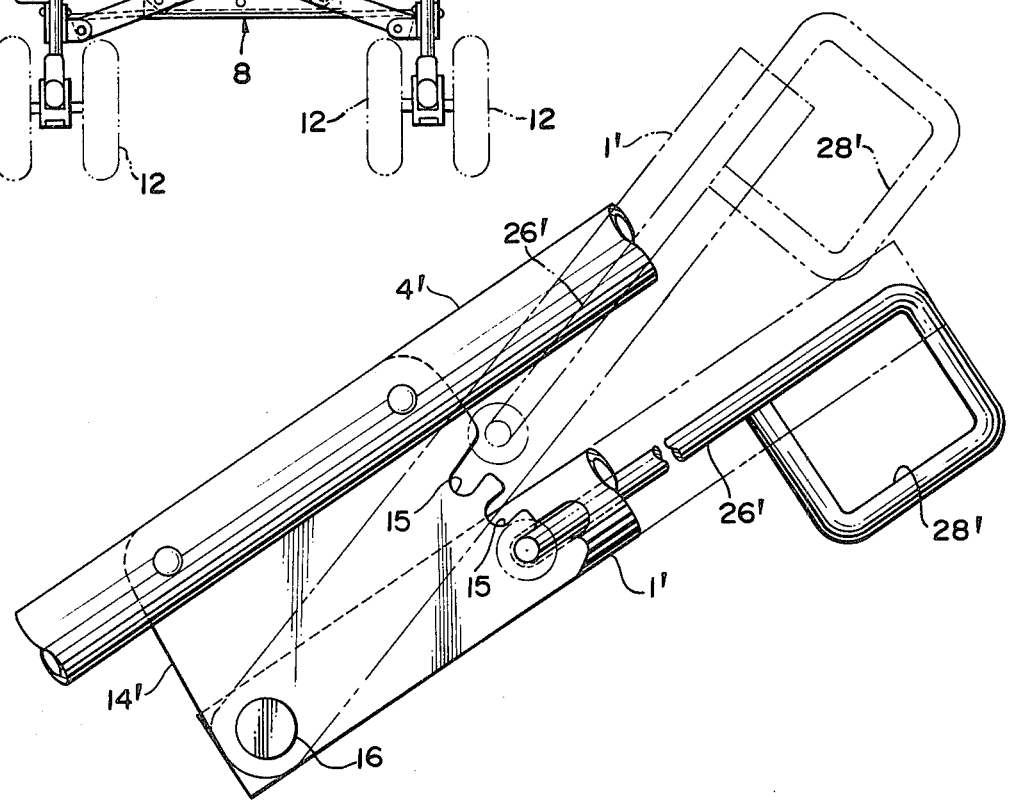

FIG. 7
FIG. 8
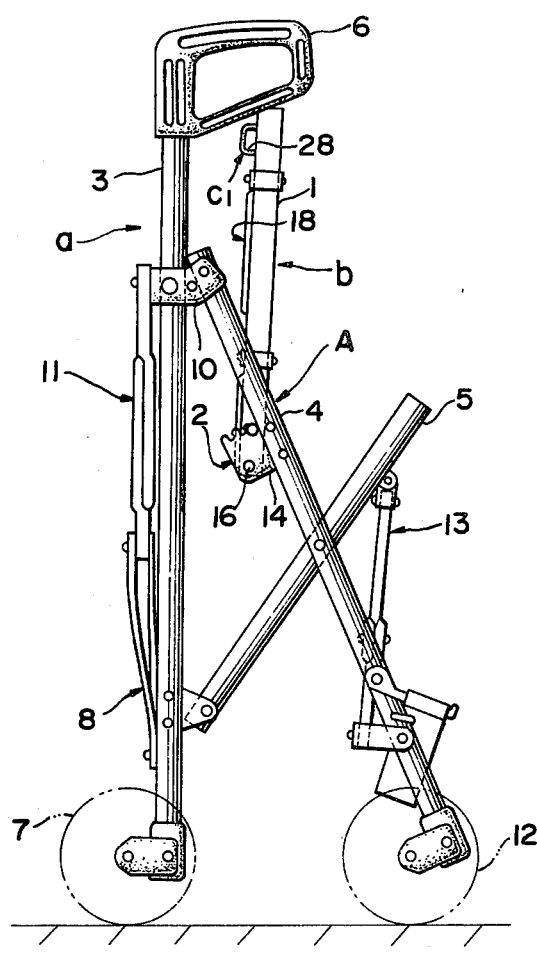
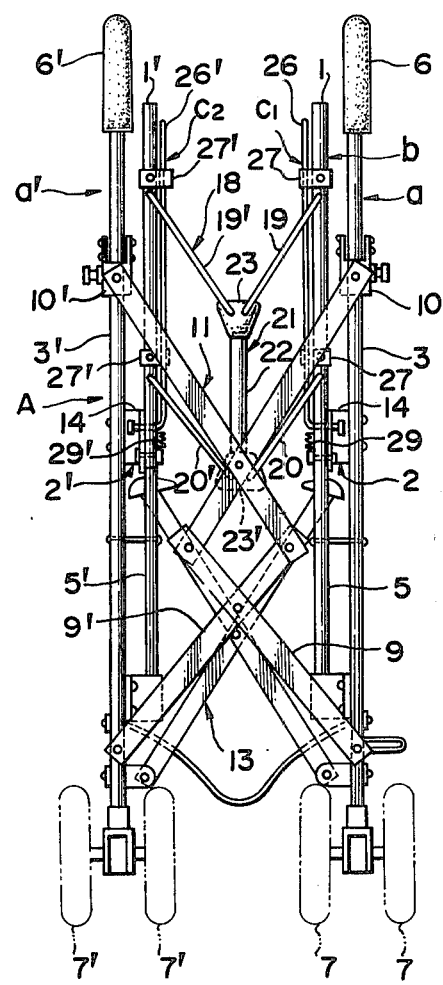

FIG. 9
FIG. 10
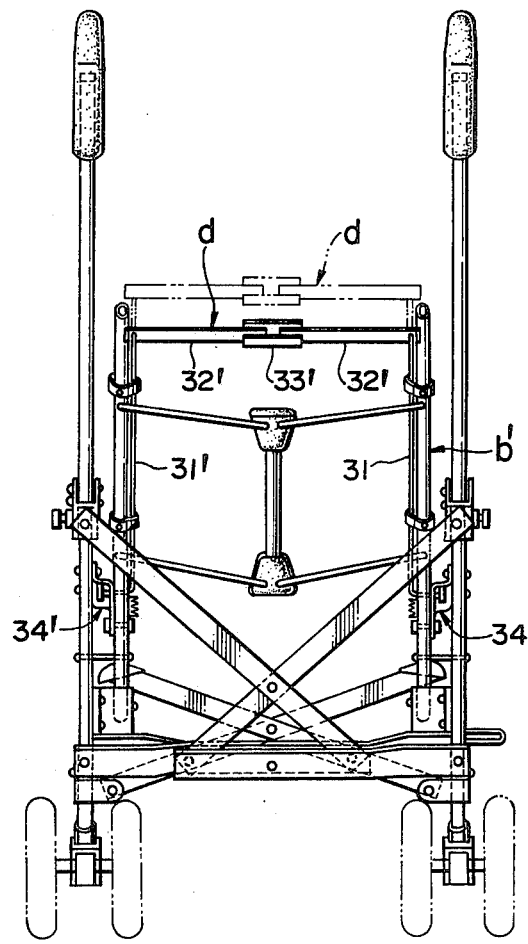
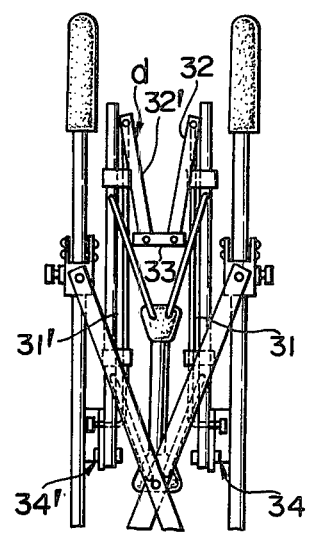

BABY CARRIAGE

FIELD OF THE INVENTION

The present invention relates to a foldable baby carriage, and more particularly to a foldable baby carriage having a reclining mechanism for changing the seating inclination of the carriage.

SUMMARY OF THE INVENTION

It is one object of this invention to provide a novel foldable baby carriage having a reclining mechanism by which the seating inclination of the carriage can be selected from any one of a number of possible positions.

Another object of this invention is to provide a novel foldable baby carriage having a mechanism for maintaining a selected seating inclination.

Yet another object of this invention is to provide a novel foldable baby carriage having an operating mechanism for changing the seating inclination of the reclining mechanism.

These and other objects are achieved by providing a novel baby carriage having a foldable frame to which is pivotably connected reclining rest rods supporting the back of the carriage seat. The rest rods are capable of being inclined to any selected one of a plurality of positions, as defined by a locking mechanism rigidly attached to the foldable carriage frame and pivotably connected to the inclined rest rods. Operating rod members are movably connected to the rest rods to select the desired inclination and to engage the locking mechanism in accordance with the selected inclination.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a side elevational view of an embodiment of the present invention;

FIG. 2 is a rear elevational view of the embodiment as shown in FIG. 1;

FIG. 3 is a front elevational view of the embodiment as shown in FIG. 1;

FIG. 4 is an enlarged side elevational view of a locking mechanism for a rest rod;

FIG. 7 is a side elevational view of the baby carriage as shown in FIG. 1 with the carriage frame folded;

FIG. 8 is a rear elevational view of the baby carriage as shown in FIG. 7;

FIG. 9 is a rear elevational view of another embodiment of the present invention; and FIG. 10 is a partially omitted view in rear elevation of the embodiment as shown in FIG. 9, which is in a folded state.

DETAILED DESCRIPTION OF THE PREFERRED EMBODIMENTS

Figure 5:
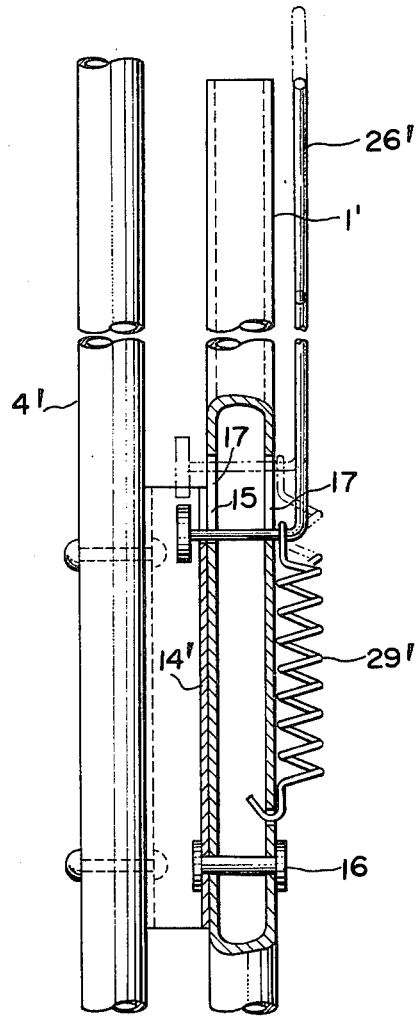
FIG. 5 is a partially cut-out view in enlarged side elevation of the locking mechanism as shown in FIG. 4.
Figure 6:
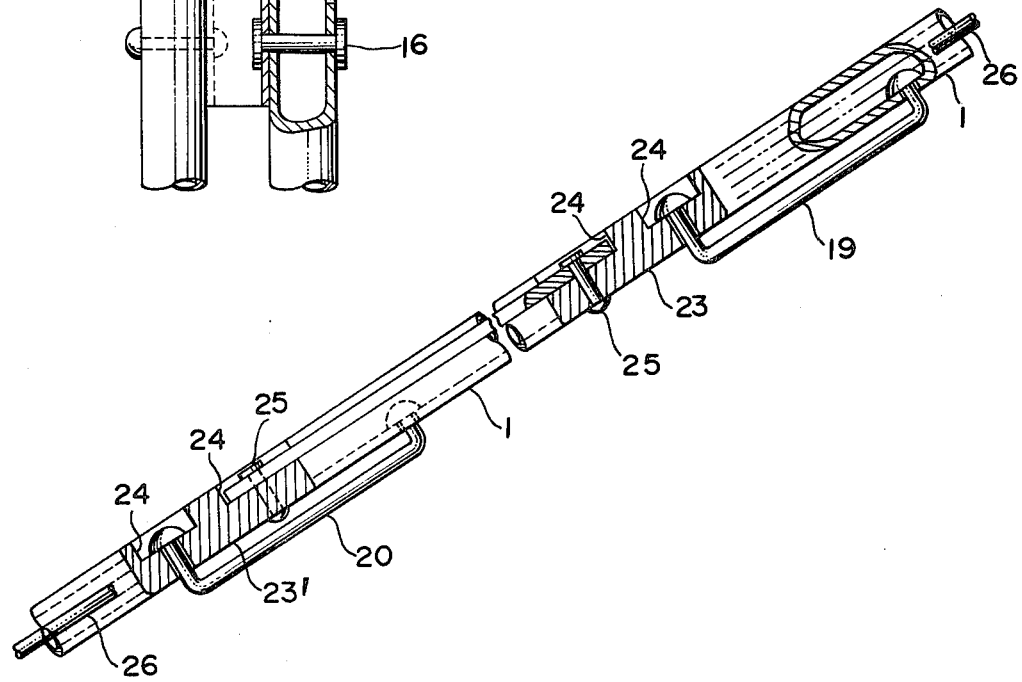
FIG. 6 is a partially cut-out view in enlarged side elevation of a seat supporting frame.

Referring now to the drawings, wherein like reference numerals designate identical or corresponding parts throughout the several views, and more particularly to FIG. 1 thereof, the right and left frames a, a' of the baby carriage frame A is seen to consist of right and left handle rods 3, 3'; front rods 4, 4'; and seat rods 5, 5'.

The handle rods 3, 3' are provided with handles 6, 6' of a synthetic resin at the upper ends thereof as well as rotatable rear wheels 7, 7' at the lower ends thereof. A pivotal operation member 8 is provided so that both ends thereof are pivotally connected to the lower end portions of the handle rods 3, 3'.

The operation member 8 consists of two rods 9, 9' which are longer than a half of the width of the carriage frame A and which are pivotally connected to each other at the central portion thereof.

The handle rods 3, 3' are provided with movable members 10, 10' slidably fitted thereon, and the upper ends of the front rods 4, 4' are pivotally connected to the front ends of the movable members 10, 10'. To the rear ends of the movable members 10, 10' and the free ends of the operation member 8, the four ends of an X-shaped rear frame are pivotally connected.

The upper ends of the front rods 4, 4' are pivotally connected to the movable members 10, 10' so that the rods 4, 4' are inclined in the longitudinal direction. The front rods 4, 4' have rotatable front wheels 12, 12' at the lower ends thereof. The rear ends of the seat rods 5, 5' are pivotally connected to the lower portions of the handle rods 3, 3', and four ends portions of an X-shaped foldable front beam 13 are pivotally connected to the front portions of the seat rods 5, 5' and the lower portions of the front rods 4, 4'.

Thus, the carriage frame A can be folded while drawing the right and left frames a, a' towards each other by upwardly sliding the front rods 4, 4'.

To the inner side surfaces of the intermediate portions of the front rods 4, 4' inclined in the right and left frames a, a' of the carriage frame A, locking members 14, 14' are secured, to which rest rods 1, 1' are secured. The locking members 14, 14' are provided with suitably spaced recesses 15 in the upper edges thereof on the side of the handle rods 3, 3', and the lower ends of the rest rods 1, 1' are pivotally connected to the inner surfaces of the lower portions of the locking members 14, 14' so as to allow the rest rods 1, 1' to be incliningly moved in the longitudinal direction.

The rest rods 1, 1' have guide slots 17 of a suitable length in the inner and outer sides of the lower portions thereof, and the four ends of a foldable seat supporting frame 18 are pivotally connected to the rear surfaces of the rest rods 1, 1'.

The seat supporting frame 18 consists of a pair of upper operation rods 19, 19' and a pair of lower operation rods 20, 20', and the inner ends of the rods 19, 19', 20, 20' are pivotally connected to the upper and lower ends of a connecting member 21 with the outer ends thereof pivotally connected to the upper and lower portions of the rear surfaces the rest rods 1, 1'.

The operation rods 19, 19', 20, 20' are made of wires of a suitable diameter and they are shorter than a half of the width of the carriage frame A, the inner portions of these rods 19, 19', 20, 20' being a little lower than the outer portions thereof so that they can be easily folded.

The connecting member 21 consists of a connecting strip 22 disposed equidistant from and parallel to the rest rods 1, 1', and support members 23, 23' made of a synthetic resin and connected to both ends of the connecting strip 22. The support members 23, 23' have substantially a triangular shape and they have recessed connecting portions 24 in the three corners of the rear surfaces thereof. To the central connecting portions 24, both ends of the connecting strip 22 are pivotally connected with pins 25, and, to the right and left connecting portions 24, the inner ends of the operation rods 19, 19', 20, 20' are pivotally connected.

The rest rods 1, 1' are provided with operation members $C_1$, $C_2$, which consist of operation rods 26, 26' disposed inside the rest rods 1, 1' and which are vertically movable via support rings 27, 27'.

The operation rods 26, 26' are made of wires of a suitable diameter, and the upper ends thereof are almost as high as those of the rest rods 1, 1' and have bent operation portions 28, 28' integrally formed therewith. The lower portions of the operation rods 26, 26' extend along the rest rods 1, 1' so that the lower ends thereof are outwardly bent to be passed through the guide slots 17 of the rest rods 1, 1' and projected therefrom. These projected portions of the operation rods 26, 26' are engaged with one of the recesses 15 of the locking members 14, 14'.

Between the lower bent portions of the operation rods 26, 26' and the lower portions of the rest rods 1, 1', springs 29, 29' are provided so as to downwardly urge the rods 26, 26' at all times.

The rest rods 1, 1' can be inclined in a stepped manner by engaging the lower ends of the operation rods 26, 26' with the recesses 15 of the locking members 14, 14' in a stepped manner. The stopping of the rest rods 1, 1' in a stepped manner while engaging the operations rods 26, 26' with the locking members 14, 14' can be effected by locking mechanism 2, 2' to which the operation rods 26, 26' consisting of the operation members $C_1$, $C_2$ are connected. By these rest rods 1, 1' and the supporting frame 18, a rest frame b is formed in the central portion of the carriage frame A. This rest frame b forms a back portion with respect to the seat and can be incliningly moved with ease and folded in the widthwise direction.

In order to adjust the angle of inclination of the rest frame b of the above-described construction, the operator applies his fingers to the operation portions 28, 28' of the operation rods 26, 26' and upwardly pulls them against the elastic forces of the springs 29, 29' so as to disengage the lower ends of the rods 26, 26' from the recesses 15 of the locking members 14, 14'. Then, the rest rods 1, 1' can be incliningly moved in the longitudinal direction. When the rest rods 1, 1' are then incliningly moved at a desired angle with the operator's fingers removed from the operation rods 26, 26', the operation rods 26, 26' are downwardly urged by the elastic forces of the springs 29, 29' and thereby lowered. At this time, the lower ends of the operation rods 26, 26' are engaged with another of the corresponding recesses 15 so that the rest rods 1, 1' are thereby locked and the angle of inclination of the rest frame b is retained. Thus the angle of inclination of the rest frame b is retained in such number of steps in the longitudinal direction that corresponds to the number of the recesses 15.

When the rest frame b is upwardly moved while upwardly sliding the front rods 4, 4' with the movable members 10, 10', to fold the carriage frame A, the operation rods 19, 19', 20, 20' are rotated around their respective pivots and the connecting strip 21 is downwardly moved by its own weight to help in rotating the operation rods 19, 19', 20, 20'. Since the seat supporting frame 18 is foldingly moved due to the downward movement of the connecting strip 21, the vertical escaping movement necessary for the rest rods 1, 1' can be attained and the rest frame b is folded in the widthwise direction as shown in FIG. 8.

FIG. 9 shows another embodiment of the present invention. In this embodiment, the outer ends of operation strips 32, 32' are pivotally connected to the upper ends of operation rods 31, 31', which operation strips 32, 32' are shorter than a half of the width of a rest frame b', and the inner ends of the operation strips 32, 32' are pivotally connected to a connecting member 33, to form an operation member d.

The connecting member 33 is formed in the shape of a letter "U" by bending a flat material, and it has recesses in the upper and both side portions thereof. The inner bottom portion of the connecting member 33 is applied to and engaged with the lower edges of the operation strips 32, 32', the inner end portions of which are connected to the inner surfaces of the both side portions of the connecting member 33 via shafts provided thereon.

Thus, the operation strips 32, 32' are prevented by the connecting member 33 from being upwardly moved, and are rotated in the downward direction only.

The above operation member d is connected to locking mechanisms 34, 34', and the operation rods 31, 31' are raised together by the connecting member 33 so as to be removed from the locking mechanisms 34, 34'. At this time, the rest frame b' is ready to be incliningly moved to adjust and retain the angle of inclination thereof. When the carriage frame A' is folded, the operation strips 32, 32' are bent to a position lower than the pivots thereof on the connecting member 33 and, consequently, the rest frame b' can be folded without trouble.

Since the baby carriage of the present invention has the above-described construction, the rest rods constituting the rest frame can be incliningly moved independently in a stepped manner. Thus, the rest frame is disposed within the carriage frame of a baby carriage, and can be folded in the widthwise direction, so as to allow the angle of the rest rods to be adjusted and retained. Thus, the present invention provides a baby carriage with a reclining mechanism on the seat thereof which can be folded to a small size.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a baby carriage having right and left frames and which is folded while drawing said frames towards each other, the improvement comprising:
   rest rods pivotably connected to said frames and capable of being inclined in a stepped manner in a plurality of positions;
   locking means secured to said frames and pivotally connected to said rest rods for stopping said rest rods in any one of a plurality of inclined positions;
   operating means movably connected to said rest rods for selecting any one of said plurality of inclined positions and for engaging said locking means accordingly;
   a pair of upper operation rods, each having one end pivotally connected to a different one of said rest rods;

a pair of lower operation rods, each having one end pivotally connected to a different one said rest rods; and a connecting member, the other ends of said upper operation rods being pivotally connected to one end of said connecting member, the other end of said lower operation rods being pivotally connected to the other end of said connecting member; said operation rods and connecting member forming a back support for said carriage.

2. The baby carriage of claim 1 wherein said locking members have a plurality of recesses and said operating means have lower bent portions which are selectively engagable with said recesses, said operating means extending parallel to said rest rods and lying immediately adjacent thereto, whereby said operating means may be actuated while grasping said rest rods.

3. The baby carriage of claim 1 wherein each said locking means is connected to the same frame element as each said rest rod and each said rest rod contacts only said frame element and said connecting members;

whereby said inclined position may be maintained following the folding of said baby carriage.

4. The baby carriage of claim 2 wherein the upper ends of each of said operating means are connected by an operating member, said operating member comprising:

a pair of operating strips, each having one end pivotally connected to said upper end of a different one of said operating means; and a second connecting member pivotally connected between the other ends of said operating strips; whereby all of said operating means may be simultaneously actuated by means of said operating member.

* * * * *